(12) United States Patent
Chan et al.

(10) Patent No.: US 7,613,944 B2
(45) Date of Patent: Nov. 3, 2009

(54) PROGRAMMABLE LOCAL CLOCK BUFFER CAPABLE OF VARYING INITIAL SETTINGS

(75) Inventors: Yuen H. Chan, Poughkeepsie, NY (US); Michael J. Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 11/609,403

(22) Filed: Dec. 12, 2006

(65) Prior Publication Data

US 2008/0141061 A1 Jun. 12, 2008

(51) Int. Cl.
*G06F 1/04* (2006.01)
(52) U.S. Cl. .......................... 713/501; 713/401; 716/3; 327/172
(58) Field of Classification Search .................. 713/501, 713/400; 716/3; 327/172
See application file for complete search history.

(56) References Cited

U.S. PATENT DOCUMENTS 5,956,256 A * 9/1999 Rezek et al. .................... 716/3
6,107,850 A * 8/2000 Shimizu ...................... 327/172
6,288,589 B1 * 9/2001 Potter et al. .................. 327/295
6,784,709 B2 * 8/2004 Ryu ........................... 327/172

* cited by examiner

*Primary Examiner*—Thuan N Du
(74) *Attorney, Agent, or Firm*—Stephen J. Walder, Jr.; Diana R. Gerhardt

(57) ABSTRACT

A programmable local clock buffer for integrated circuit devices which is capable of varying initial settings is provided. The illustrative embodiments allow a single type of local clock buffer (LCB) to be used throughout an integrated circuit design while still being able to provide differing initial offsets and pulse widths for different local circuitry portions of the integrated circuit design. Delay circuit paths are provided, which provide discreet delay values, within the LCB that can be chained together when the LCB is instantiated to set the initial offset and pulse width values. When an LCB is instantiated in the integrated circuit device design, various ones of the delay circuit paths are connected together with the existing circuit paths of the LCB, i.e. the circuit paths that provide the pre-established offset and pulse width values, in order to set the initial offset and pulse width values for the LCB.

21 Claims, 12 Drawing Sheets

PROGRAMMABLE LOCAL CLOCK BUFFER CAPABLE OF VARYING INITIAL SETTINGS

BACKGROUND

1. Technical Field

The present application relates generally to an improved integrated circuit device. More specifically, the present application is directed to a programmable local clock buffer for integrated circuit devices which is capable of varying initial settings.

2. Description of Related Art

With modern high-speed integrated circuit devices clock grids are utilized for distributing a system clock signal to the various portions of the integrated circuit. The clock signal from the clock grid is commonly redistributed locally by way of local clock buffers (LCBs). A typical array circuit design block, e.g., a Segment Look-aside Buffer (SLB), Translation Look-aside Buffer (TLB), Effective to Real Address Translation (ERAT) block, or the like, uses many LCBs to distribute the clock signal throughout the design.

FIGS. 1A-1D illustrate an exemplary diagram of a known LCB structure which may be used in array designs. The LCB structure 100 has the capability to adjust the offset and pulse width of the clock signal between pre-established programmable settings. The programming of the settings of the LCB allows hardware tuning for debugging, for example.

As shown in FIGS. 1A-1D, the LCB 100 includes a first portion 110 in which there are a plurality of circuit paths 112-118 for providing different pre-established programmable offsets for an input clock signal clkg. Each circuit path 112-118 has a set of delay elements 120 which operate to delay the clock signal clkg by predetermined amounts such that differing offsets of the leading edge of the clock signal clkg are made possible. The particular circuit path 112-118 used to adjust the offset of the leading edge of the clock signal clkg may be determined based on a controller (not shown) asserting a signal along one of the circuit paths 112-118.

Similarly, a second portion 130 of the LCB 100 includes a plurality of circuit paths 132-138 for providing different pre-established programmable pulse widths of the input clock signal clkg. The circuit paths 132-138 have sets of delay elements 140 which operation to provide different points in the input clock signal clkg where the clock signal is "chopped-off," i.e. causes the trailing edge of the input clock signal clkg to occur. The particular circuit path 132-138 used to adjust the pulse width of the clock signal clkg may be determined based on a controller (not shown) asserting a signal along one of the circuit paths 132-138.

For example, a default setting for pulse width adjustment may be to assert a signal along the circuit path 134 pw1 so as to allow adjustment for greater or smaller pulse widths. Asserting a signal along circuit path 138 pw3 disables pulse width adjustment and the pulse width of the input clock signal clkg is utilized.

As a result of the adjustments made by the LCB 100, a resulting local clock signal clkl1 is output having a desired offset and pulse width for the local circuitry. The LCB 100 may be used to provide adjustment, for example, when the initial clock setting of the input clock signal clkg causes a problem in the operation of the local circuitry, e.g., an early mode or late mode clock signal. The LCB 100 may be used to adjust the clock signal clkg so that proper operation of the local circuitry is made possible. Moreover, for a debug operation, the pulse width and offset of the input clock signal clkg may be varied using the pre-established adjustments of the LCB 100 in order to test and determine the limitations of the local circuitry.

The enable_n input is used to enable/disable the LCB 100, i.e. clkl1 will stay at a low voltage state when enable_n=1. The set0 and pw0 inputs are connected to dummy devices to satisfy checking tool requirements. That is, when the other settings are not set (i.e. set1, set2, set3, pw1, pw2, and pw3 are not set), set0 and pw0 are the default, no matter what their inputs are.

Typically, in an integrated circuit design, the same LCB structure is utilized throughout the integrated circuit design in order to control the clocks distributed to the local circuitry portions of the integrated circuit device. A problem exists in the known LCB structure, however, in that sometimes a need arises in which a different initial offset or pulse width value is needed in different LCBs within the same circuit design. That is, while the pre-established settings for the LCB 100 may be appropriate for one or more portions of local circuitry in an integrated circuit design, the pre-established settings for the LCB 100 may not be appropriate for other portions of local circuitry in the integrated circuit design, i.e. different pulse widths and offsets are needed than are able to be provided by the LCB 100.

In order to address this problem one could use a different programmable setting as the default of the LCB 100. However, in doing so, one would lose some programmable adjustment in the hardware. For example, in the example shown in FIGS. 1A-1D, there are four pulse width settings in the LCB 100. The default setting is pw1 so that one can adjust the pulse width down one setting or up one setting. The pw3 setting is used to disable the pulse width adjustment and track with the clock grid edges. If one uses a setting of pw0 or pw2 as the default, then either the capability to decrease or increase the pulse width setting in the hardware is lost.

Another possible solution is to add more pre-established programmable settings to the LCB 100 structure. However, adding more programmable settings adds significantly to the LCB 100 structure. In today's integrated circuit devices with increasing amounts of functional logic and miniaturizing of the integrated circuit devices, space available for such functional logic is at a premium. Thus, adding more pre-established programmable setting circuit structures to the LCB 100 is not generally an acceptable solution.

SUMMARY

The illustrative embodiments provide a programmable local clock buffer for integrated circuit devices which is capable of varying initial settings. The mechanisms of the illustrative embodiments allow a single type of local clock buffer (LCB) to be used throughout an integrated circuit device design while still being able to provide differing initial offsets and pulse widths for different local circuitry portions of the integrated circuit device design. By having one common LCB that is used throughout the integrated circuit device design, the mechanisms of the illustrative embodiments reduce design time by not having to create various versions of the LCB for the various local circuitry portions, as would be required in the known LCB structures.

The mechanisms of the illustrative embodiments provide delay circuit paths, which provide discreet delay values, within the LCB that can be chained together when the LCB is instantiated to set the initial offset and pulse width values. These delay circuit paths, which may be a chain of buffers or other delay circuit elements, for example, are provided within the LCB but are not initially connected to the other circuit paths of the LCB.

When an LCB is instantiated in the integrated circuit device design, various ones of the delay circuit paths are connected together with the existing circuit paths of the LCB, i.e. the circuit paths that provide the pre-established offset and pulse width values, in order to set the initial offset and pulse width values. All of the delay circuit paths may be bypassed or as many delay circuit paths as desired may be chained together to achieve a desired initial offset and/or pulse width value. The number of delay circuit paths to insert and the delay quantity per delay circuit path (one delay circuit path may be made up of several 2-inverter buffers for example) is implementation dependent and may vary.

Thus, with the mechanisms of the illustrative embodiments, a new LCB structure is provided in which additional delay circuit paths are provided which may be selectively connected to pre-established offset and/or pulse width setting circuit paths of the LCB structure to thereby fine tune the initial offset and/or pulse width of the LCB. The new LCB structure may be utilized in an integrated circuit device design system to provide differing initial offsets and/or pulse widths of a clock signal provided by a clock grid in order to provide local clock signals for different local circuit portions of the integrated circuit device. The selection of the delay circuit path or paths to connect to the pre-established offset and/or pulse width setting circuit paths may be made when the LCB is instantiated in the integrated circuit device design. Thereafter, the integrated circuit device design may be utilized to fabricate the integrated circuit device.

In one illustrative embodiment, a method for providing an integrated circuit is provided. The method may comprise receiving an integrated circuit design, providing a local clock buffer in association with a local portion of the integrated circuit design, and providing one or more delay circuit paths, the one or more delay circuit paths being selectively connectable to existing circuit paths in the local clock buffer. The method may further comprise configuring the local clock buffer to use one of the existing circuit paths in the local clock buffer to obtain a pre-established initial clock signal characteristic for converting an input clock signal to a local clock signal output. Moreover, the method may comprise selectively connecting the existing circuit path used by the local clock buffer to at least one of the one or more delay circuit paths to thereby modify the pre-established initial clock signal characteristic to thereby provide a modified initial clock signal characteristic for the local clock signal output.

The local clock buffer may receive a clock input signal from a clock signal grid of the integrated circuit design and provides the local clock signal output to the local portion of the integrated circuit design. The pre-established initial clock signal characteristic may be a pulse width of the initial clock signal, and wherein the modified initial clock signal characteristic is a modified pulse width of the initial clock signal. The initial clock signal characteristic may be an offset of the initial clock signal, and wherein the modified initial clock signal characteristic is a modified offset of the initial clock signal.

A plurality of local clock buffers may be provided, each local clock buffer in the plurality of local clock buffers utilizes a same circuit element to represent the local clock buffers. At least two of the plurality of local clock buffers may have differing connections to the one or more delay circuit paths to thereby provide at least two local clock buffers that provide differing local clock signal outputs.

The one or more delay circuit paths may be provided as part of the circuit element. Alternatively, the one or more delay circuit paths may be provided as a user-specific separate logic block that is selectively added to the circuit elements representing the local clock buffers which do not include the one or more delay paths.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a mechanism for providing a programmable local clock buffer for integrated circuit devices which is capable of varying initial settings. The mechanisms of the illustrative embodiments allow a common local clock buffer (LCB) element to be used throughout an integrated circuit design while permitting differing initial offset and/or pulse width settings than the pre-established offset and/or pulse width settings at various portions of the integrated circuit design. As a result, a more customizable integrated circuit design is made possible while minimizing the area used by the LCB element and minimizing design time by eliminating the need to create different versions of the LCB element.

The illustrative embodiments may be implemented as part of an integrated circuit design system which may be in a single data processing system or may be distributed across a plurality of data processing systems that are coupled to one another via one or more communications networks. For example, one or more server computing devices may provide integrated circuit design, simulation, and analysis engines that may be accessed by users via other computing devices, such as client computing devices. A client computing device may communicate with the server computing device via the one or more communications networks so as to generate an integrated circuit design using the LCB structure of the illustrative embodiments and to control the application of simulation and analysis engines to the resulting integrated circuit models, which may be provided as netlist data structures, for example.

Alternatively, the integrated circuit design engine, simulation engine, and analysis engine may be provided entirely on the same computing device such that multiple computing devices and communication networks are not necessary. For purposes of the present description, however, it will be assumed that the illustrative embodiments are implemented in a distributed data processing system.

Figure 1A:
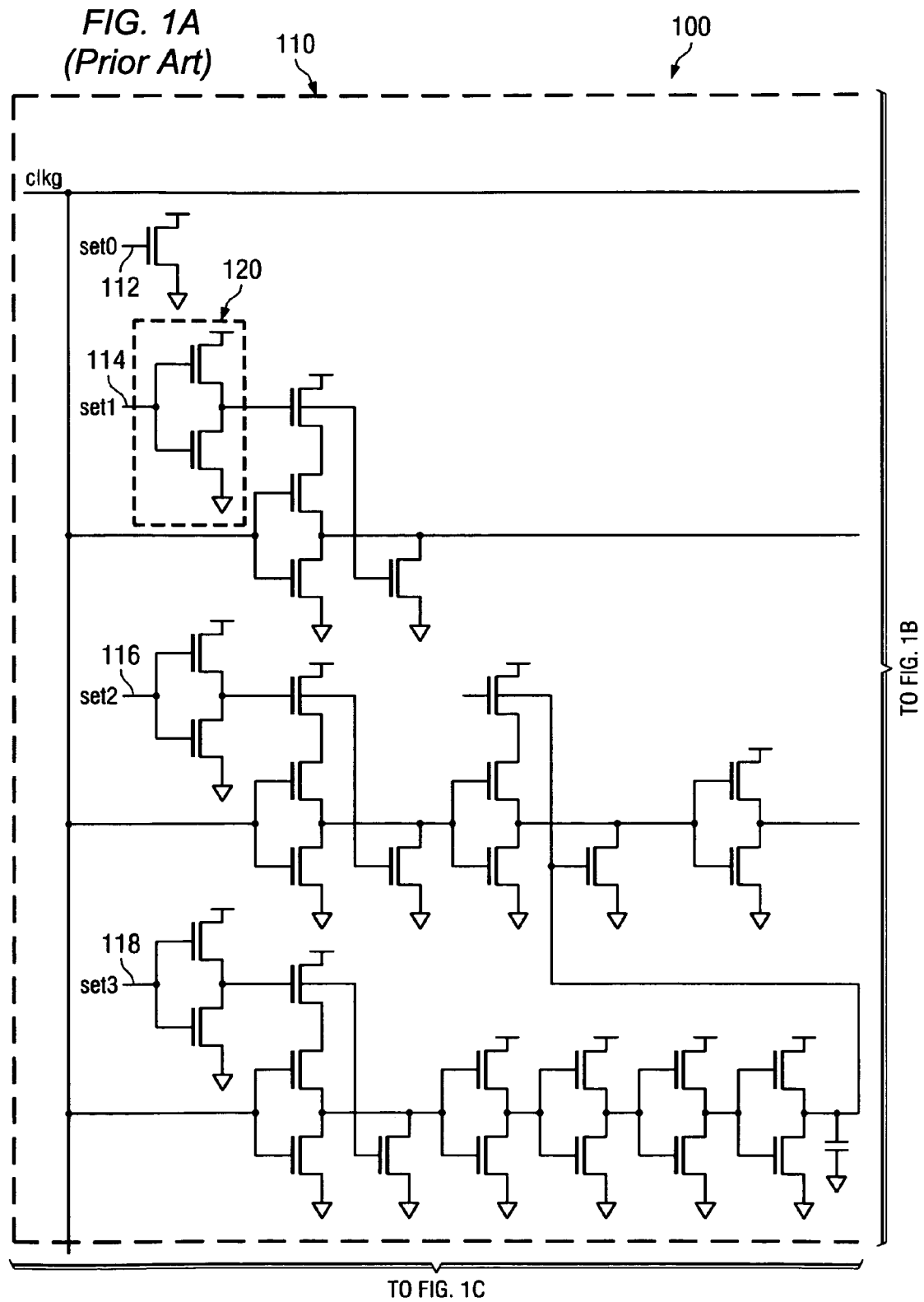
FIGS. 1A-1D illustrate an exemplary circuit diagram of a known local clock buffer (LCB) structure.
Figure 1B:
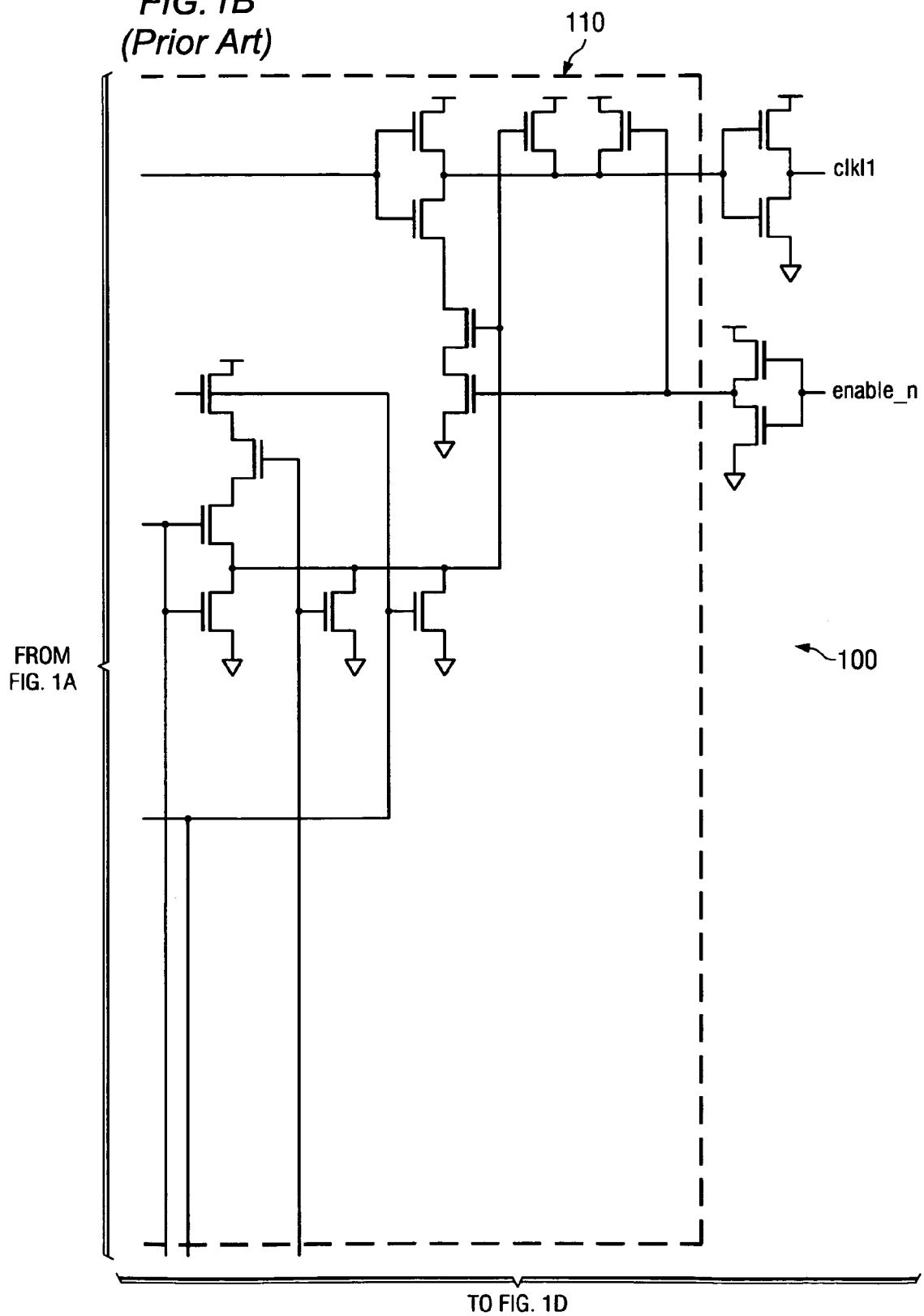
Figure 1C:
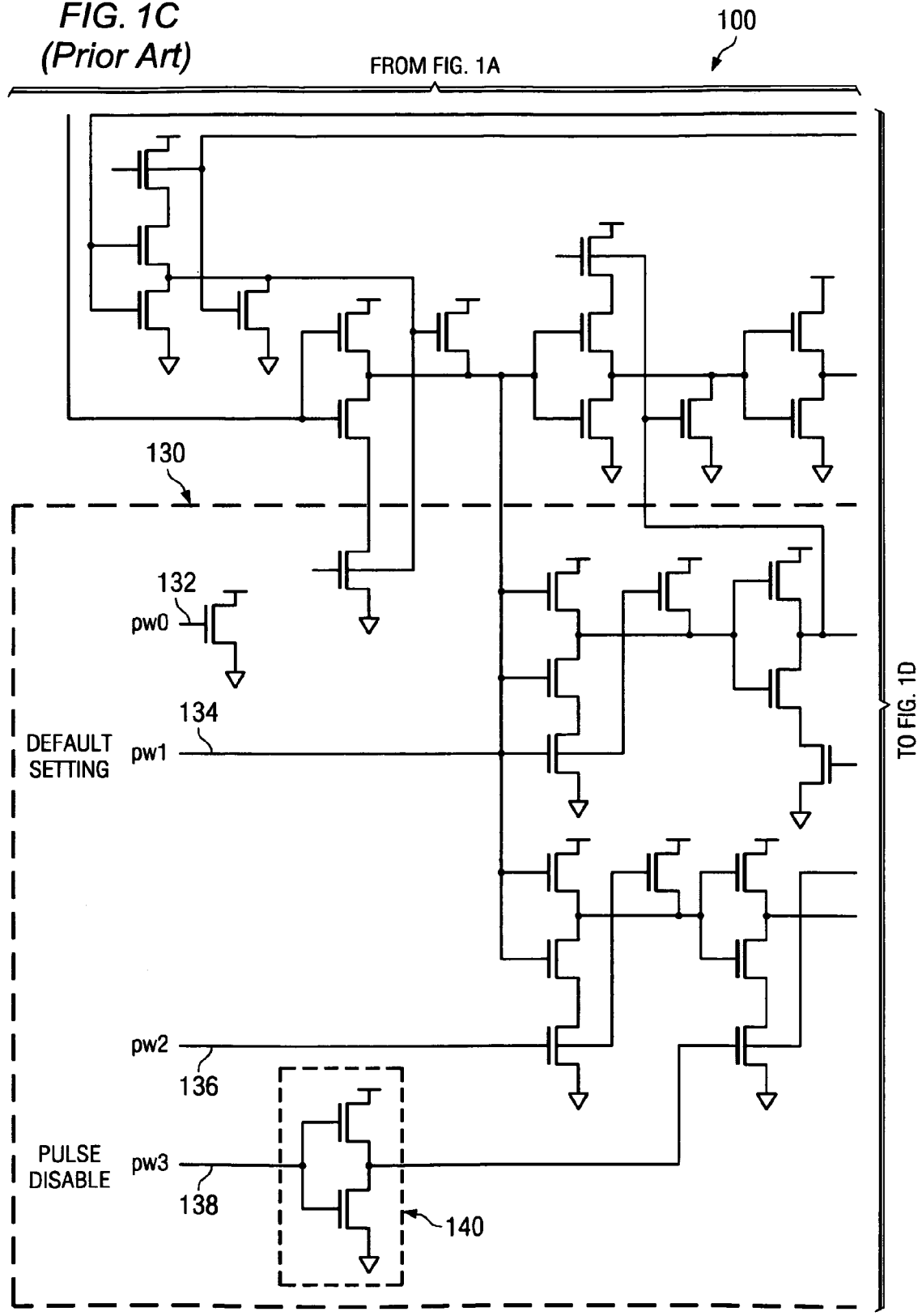
Figure 1D:
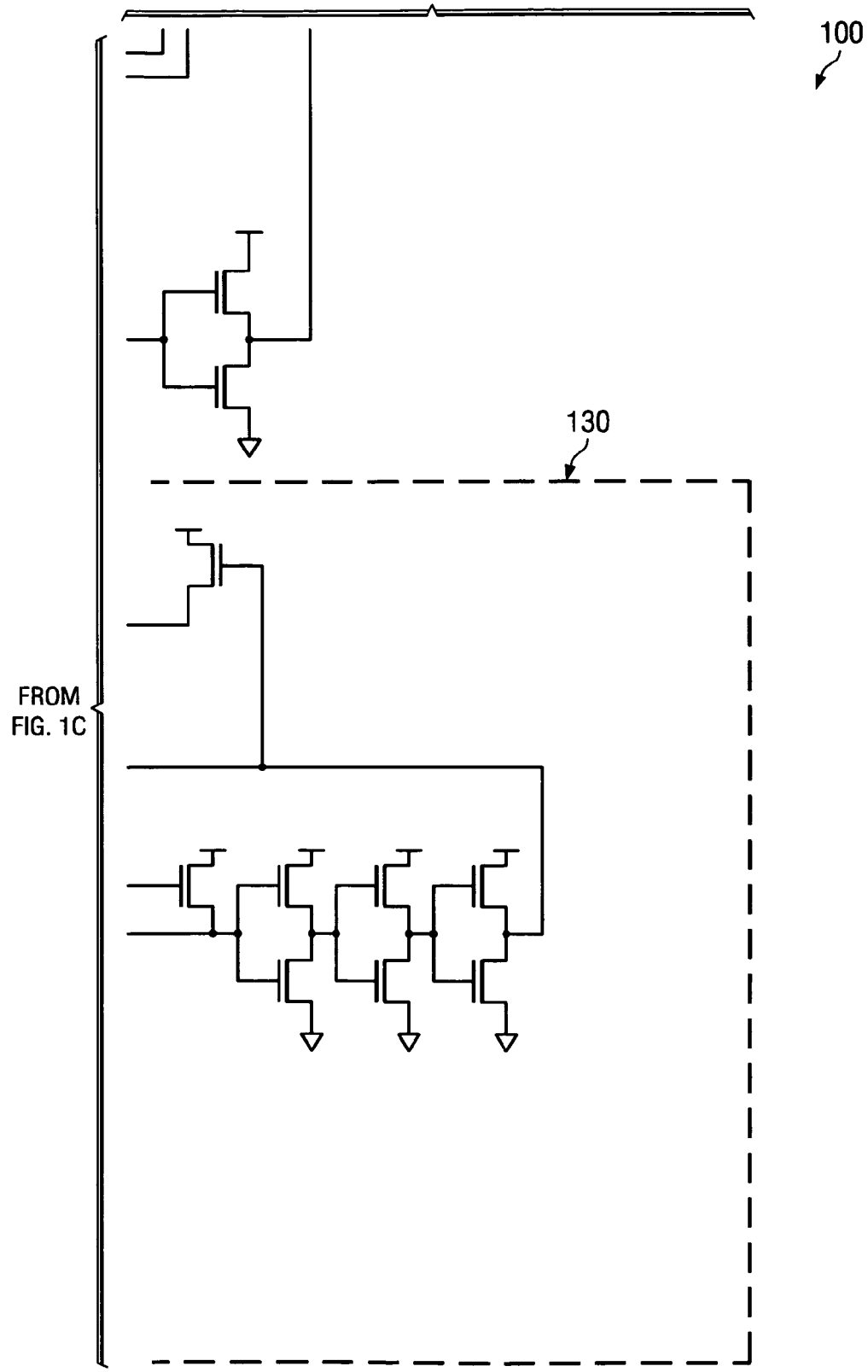
Figure 2:
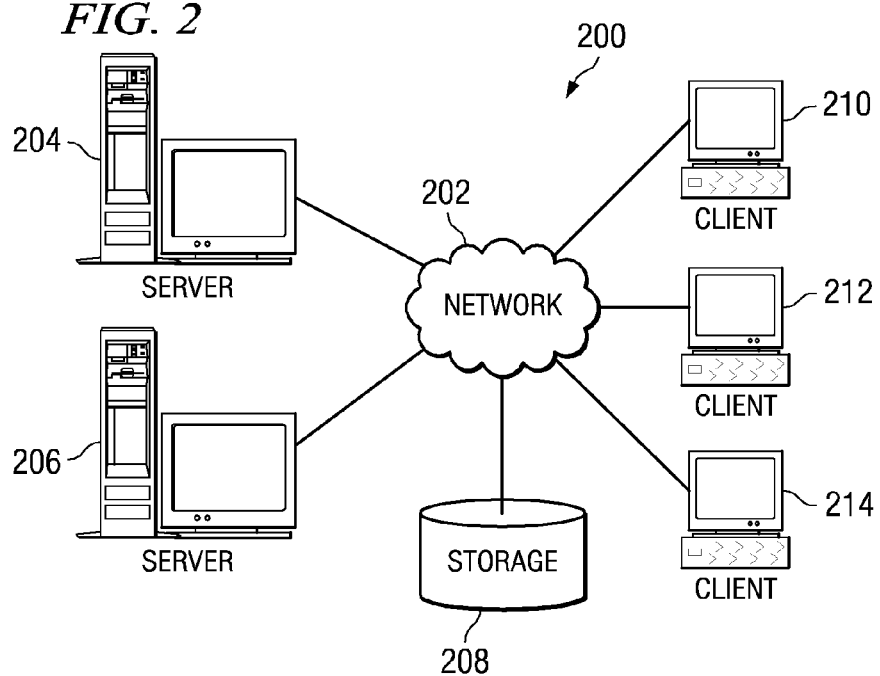
FIG. 2 is an exemplary block diagram of a distributed data processing system in which aspects of the illustrative embodiments may be implemented.
Figure 3:
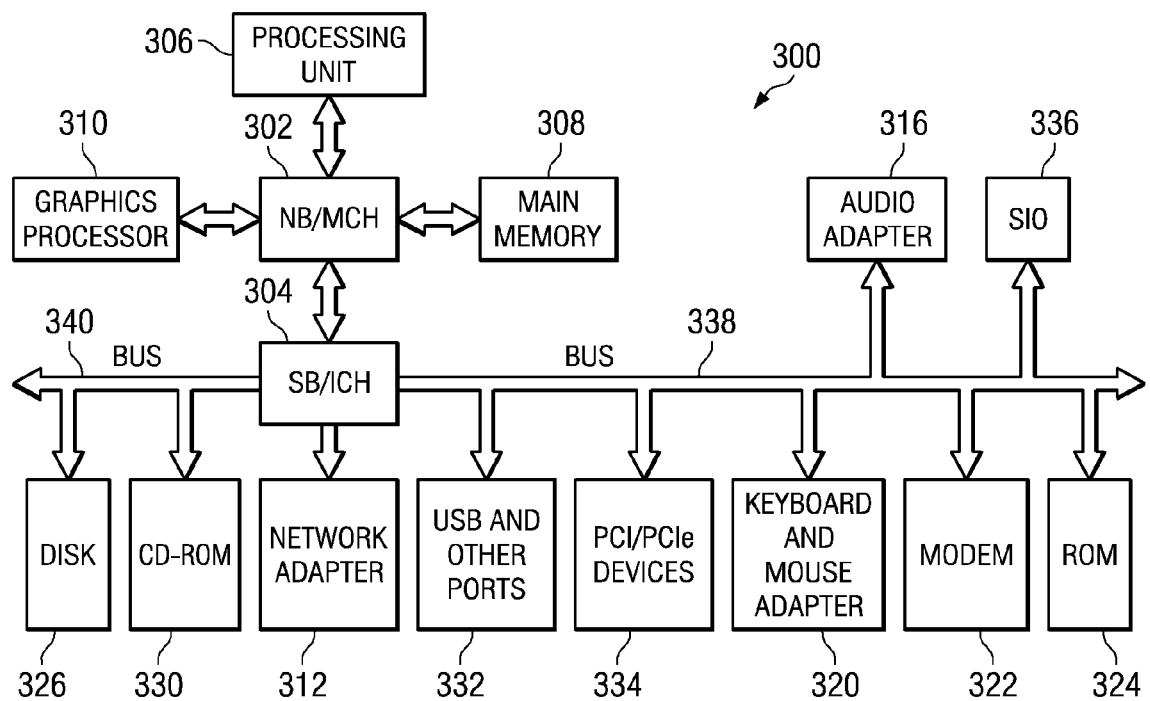
FIG. 3 is a block diagram of an exemplary data processing device in which exemplary aspects of the illustrative embodiments may be implemented.
Figure 4A:
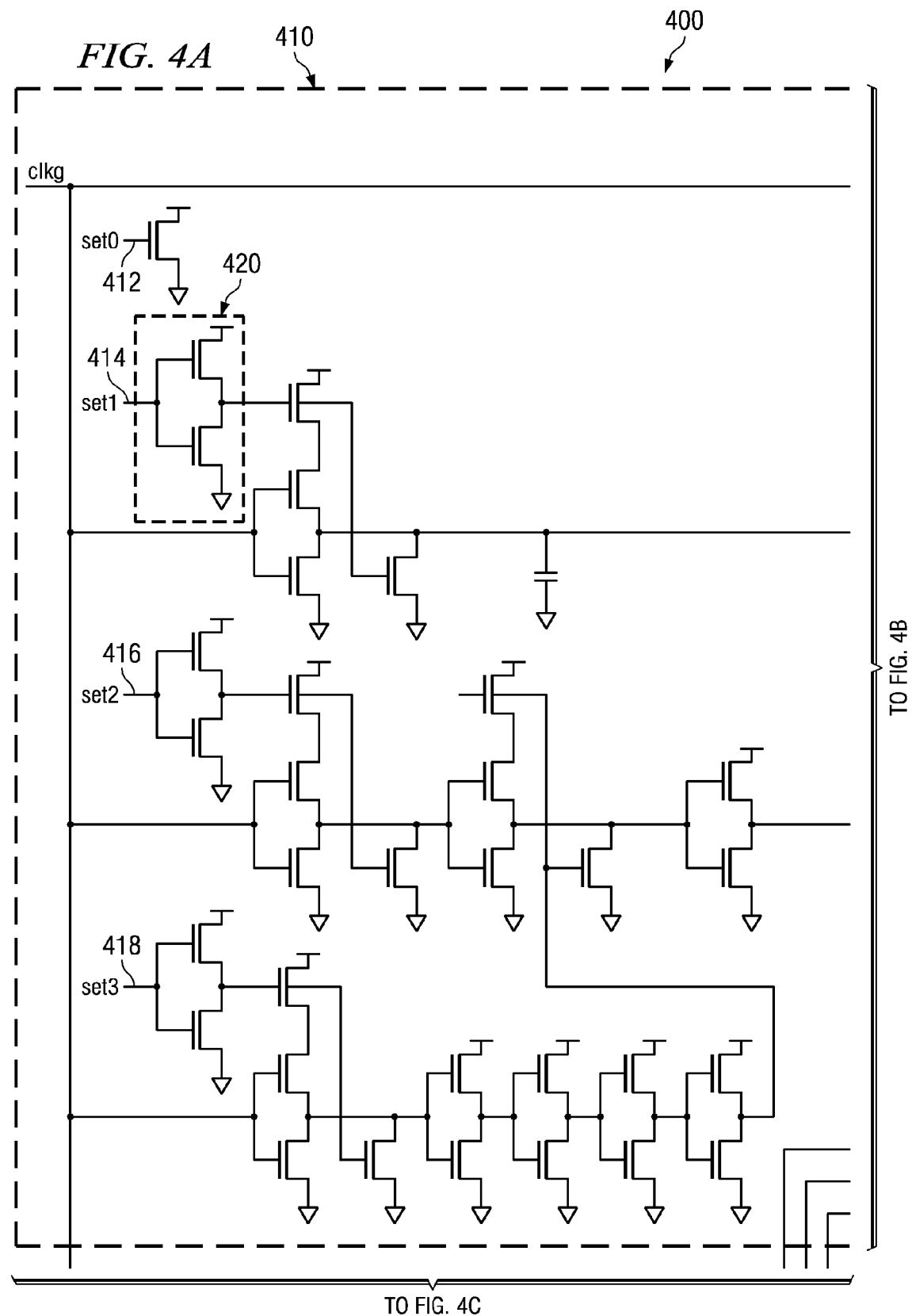
FIGS. 4A-4E illustrate an exemplary circuit diagram of a local clock buffer (LCB) in accordance with one illustrative embodiment.
Figure 4B:
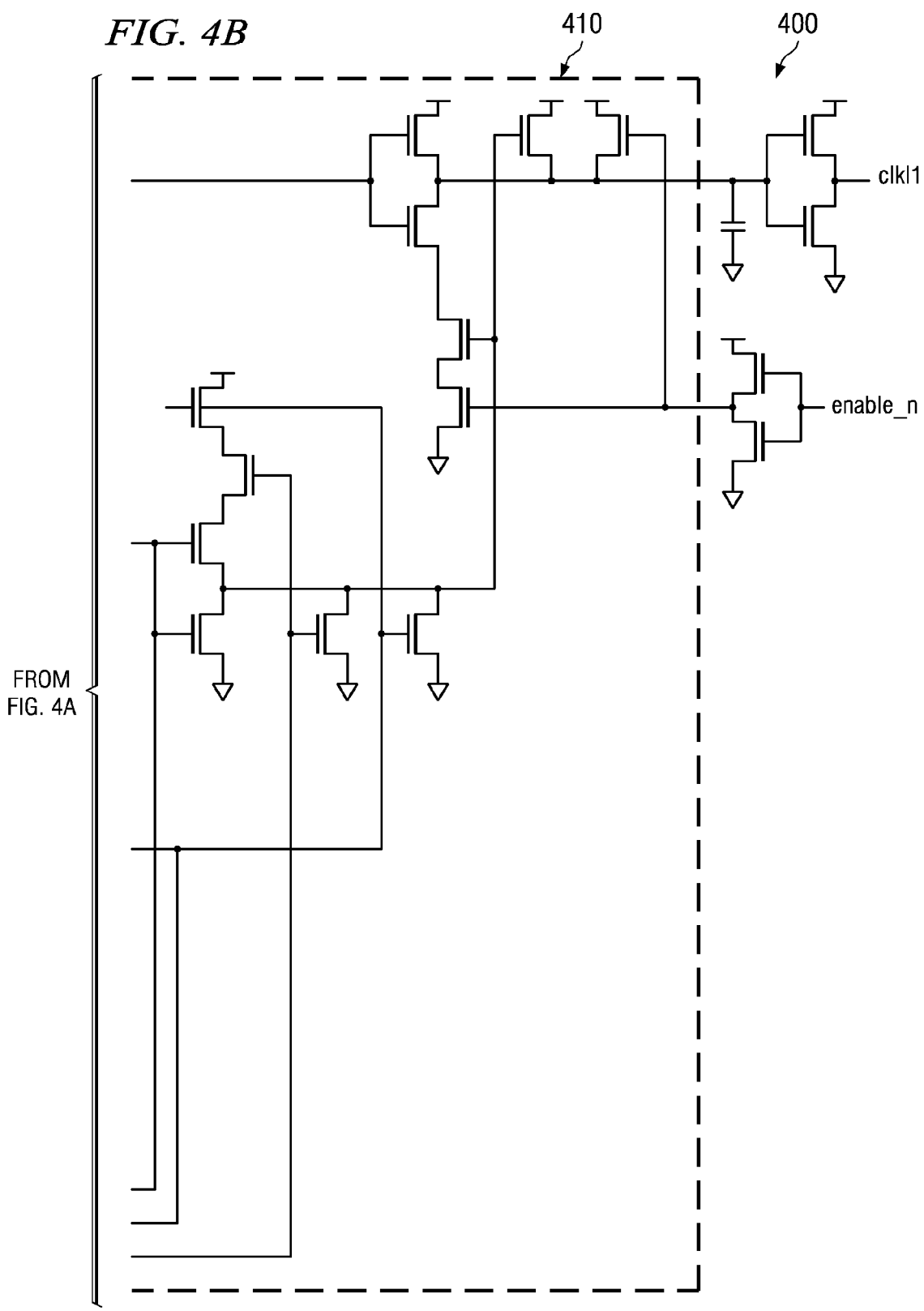
Figure 4C:
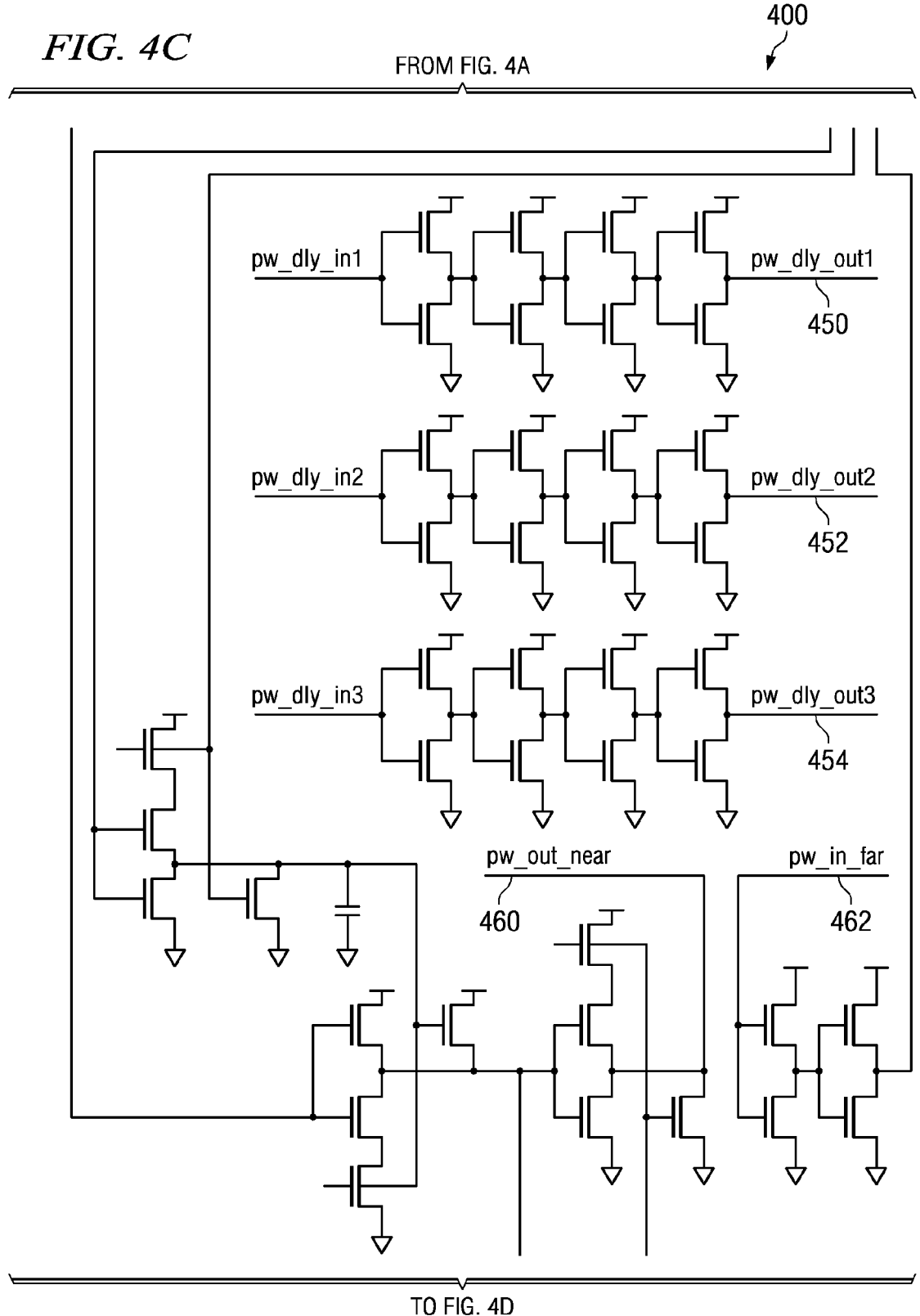
Figure 4D:
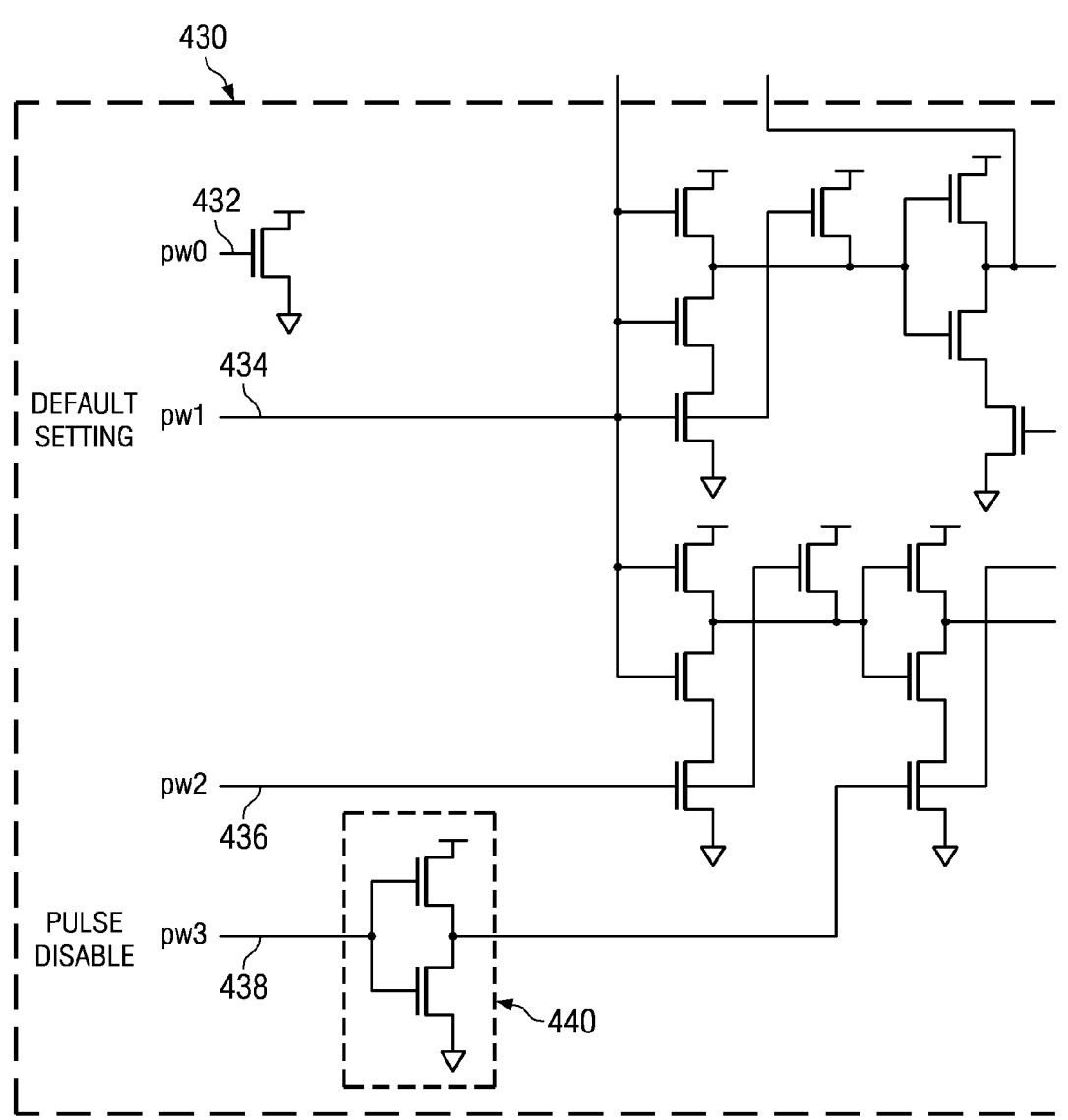
Figure 4E:
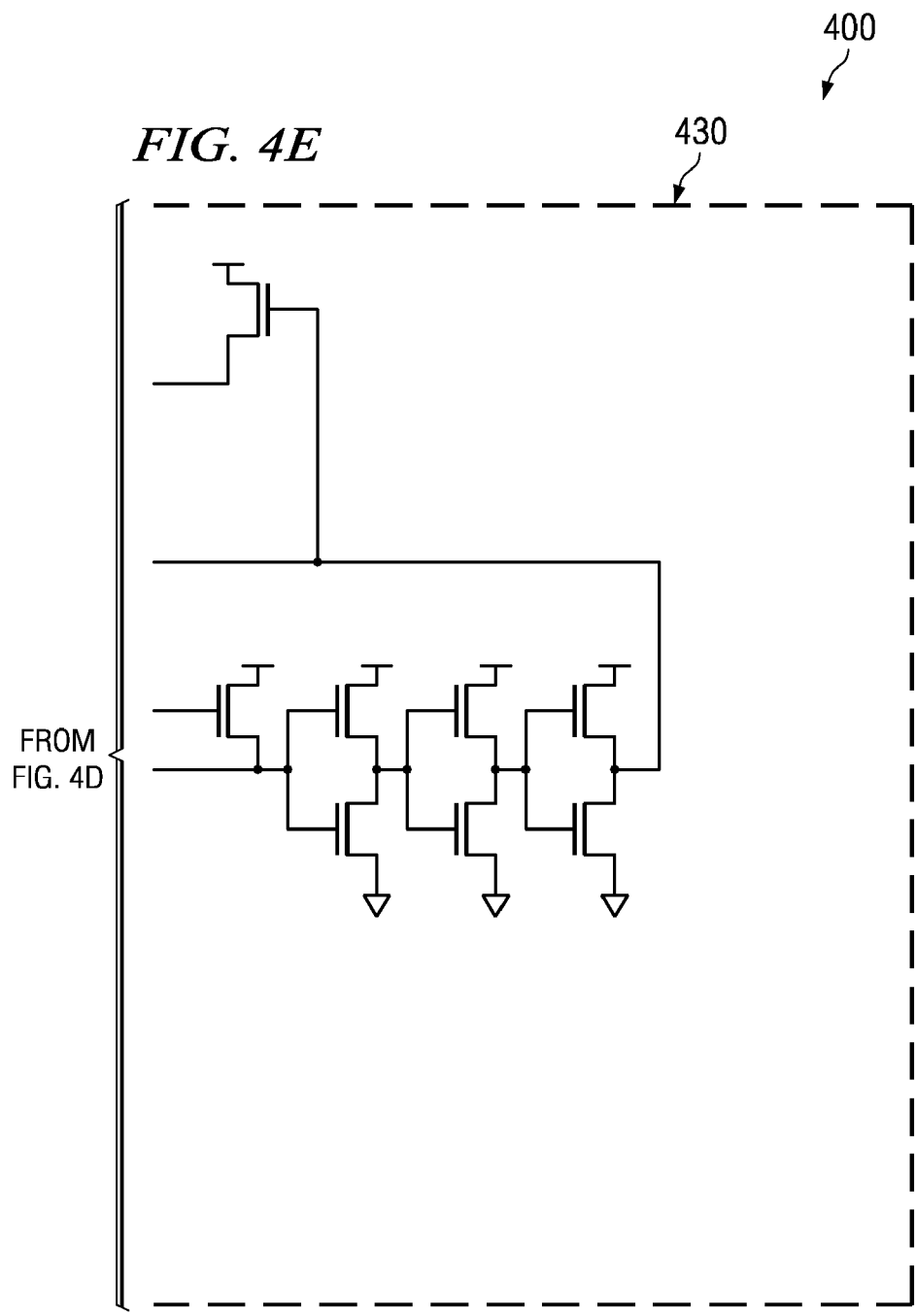

With reference now to FIGS. 2-3, exemplary diagrams of data processing environments are provided in which exemplary embodiments of the present invention may be implemented. It should be appreciated that FIGS. 2-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an exemplary distributed data processing system in which aspects of the illustrative embodiments may be implemented. Distributed data processing system 200 may include a network of computers in which embodiments of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an exemplary data processing system is shown in which aspects of the illustrative embodiments may be implemented. Data processing system 300 is an example of a computer, such as server 204 or client 210 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

The illustrative embodiments provide a system and method for providing a programmable local clock buffer for integrated circuit device designs which is capable of varying initial settings. For example, with reference again to FIG. 2, the server 204 may provide an integrated circuit design and simulation engine in accordance with the mechanisms of the illustrative embodiments. A client computing device, such as client 210, may communicate with the integrated circuit design engine to generate a circuit model upon which the simulation engine of server 204 is to operate in order to verify the design of the integrated circuit. This integrated circuit model may comprise, for example, a netlist data structure defining the various nets of the integrated circuit design as well as other information, generally known in the art, regarding clock phases, clock periods, data signal information, and the like.

It should be appreciated that while the illustrative embodiments will be described with regard to nets in a netlist data structure, the present invention is not limited to use of a netlist data structure. Rather, other types of data structures that provide a logic description representative of an integrated circuit design may be used without departing from the spirit and scope of the present invention. For example, a hardware description language data structure may be used to provide the necessary information for performing simulation of an integrated circuit model.

The mechanisms of the illustrative embodiments allow a single type of local clock buffer (LCB) to be used throughout an integrated circuit device design while still being able to provide differing initial offsets and pulse widths for different local circuitry portions of the integrated circuit device design. By having one common LCB that is used throughout the integrated circuit device design, the mechanisms of the illustrative embodiments reduce design time by not having to create various versions of the LCB for the various local circuitry portions, as would be required in the known LCB structures.

The mechanisms of the illustrative embodiments provide delay circuit paths, which provide discreet delay values, within the LCB that can be chained together when the LCB is instantiated to set the initial offset and pulse width values. These delay circuit paths, which may be a chain of one or more buffers or other delay circuit elements, for example, are provided within the LCB but are not initially connected to the other circuit paths of the LCB.

When an LCB is instantiated in the integrated circuit device design, such as via an integrated circuit device design engine, various ones of the delay circuit paths are connected together with the existing circuit paths of the LCB, i.e. the circuit paths that provide the pre-established offset and pulse width values, in order to set the initial offset and pulse width values. All of the delay circuit paths may be bypassed or as many delay circuit paths or delay elements as desired may be chained together to achieve a desired initial offset and/or pulse width value. The number of delay circuit paths to insert and the delay quantity per delay circuit path is implementation dependent and may vary.

FIGS. 4A-4E illustrate an exemplary circuit diagram of a local clock buffer (LCB) in accordance with one illustrative embodiment. In the exemplary circuit diagram of FIGS. 4A-4E, the LCB includes inserted delay circuit paths for selectively modifying the default setting pulse width. It should be appreciated that a similar set of one or more delay circuit paths may be provided in the LCB for selectively modifying the default offset of the LCB. For example, one or more delay elements, like those added to the pulse width control path, can be added after the "clkg" input before fanning out to the rest of the LCB 400. However, for purposes of simplifying the illustration and description herein, only the inserted delay circuit paths for selectively modifying the default setting pulse width are shown in FIGS. 4A-4E.

As shown in FIGS. 4A-4E, the LCB 400 includes a first portion 410 in which there are a plurality of circuit paths 412-418 for providing different pre-established programmable offsets for an input clock signal clkg. Each circuit path 412-418 has a set of delay elements 420, e.g., buffers, which operate to delay the clock signal clkg by predetermined amounts such that differing offsets of the leading edge of the clock signal clkg are made possible. The particular circuit path 412-418 used to adjust the offset of the leading edge of the clock signal clkg may be determined based on a controller (not shown) asserting a signal along one of the circuit paths 412-418.

Similarly, a second portion 430 of the LCB 400 includes a plurality of circuit paths 432-438 for providing different pre-established programmable pulse widths of the input clock signal clkg. The circuit paths 432-438 have sets of delay elements 440 which operate to provide different points in the input clock signal clkg where the clock signal is "chopped-off," i.e. causes the trailing edge of the input clock signal clkg to occur. The particular circuit path 432-438 used to adjust the pulse width of the clock signal clkg may be determined based on a controller (not shown) asserting a signal along one of the circuit paths 432-438.

Thus, similar to the known LCB structure shown in FIGS. 1A-1D above, the LCB structure of the illustrative embodiments has circuit paths 412-418 and 432-438 for providing pre-established offset and pulse width settings for clock signals to thereby generate local clock signals, such as for debugging or local circuitry adjustments. In addition to these circuit paths 412-418 and 432-438, the LCB structure 400 of the illustrative embodiments include inserted delay circuit paths 450-454 and connection lines 460-462 for connecting one or more of the delay circuit paths 450-454 into the output path of the pre-established pulse width setting circuit paths 432-438. These inserted delay circuit paths 450-454 are used to vary the initial settings of the LCB 400. Specifically, with regard to the depicted example, the inserted delay circuit paths 450-454 are used to vary the initial settings of the pulse width of the output clock signal clkl1 based on the input clock signal clkg.

With the inserted delay circuit paths 450-454 and the connection lines 460-462, the pulse width output near (pw_out_near) connection line 460 may be connected to the input side of one of the inserted delay circuit paths 450-454 and the pulse width input far (pw_in_far) connection line 462 may be connected to the output side of one of the inserted delay circuit paths 450-454 in order to add one or more delay elements into the output path of the pulse width setting circuit paths 432-438. Moreover, the output of one inserted delay circuit path 450-454 may be connected to the input of another inserted delay circuit path 450-454 in order to provide a chain of delay circuit paths for delaying the trailing edge of the resulting clock signal output clkl1. For example, the output of delay circuit path 450 may be connected to the input of delay circuit path 452 with the input of the delay circuit path 450 being connected to connection line 460 and the output of delay circuit path 452 being connected to connection line 462.

The determination as to how many and which delay circuit paths 450-454 to add into the output path of the pulse width setting circuit paths 432-438 may be made by a designer when configuring the integrated circuit design, by an automated mechanism based on results of simulation of the integrated circuit design and determined pulse width modifications required or desired, or any other suitable mechanism. For example, a designer may base how many and which ones of the delay paths to connect based on design needs/requirements checked by simulation. The actual connections may be made as shown in the design representation in FIGS. 5A-5C, for example, described hereafter.

It should be noted that while FIGS. 4A-4E illustrate the inserted delay paths 450-454 as being a fixed part of the LCB structure 400, the illustrative embodiments are not limited to such. Rather, the inserted delay paths 450-454 may be provided as a user-specific separate block that may be added to an LCB instantiation that does not include the inserted delay paths 450-454. In this way, the inserted delay paths 450-454 may be provided in a separate block that is fully customizable for the specific user's desired use. Moreover, while FIGS. 4A-4E show a particular configuration of the inserted delay paths 450-454, the inserted delay paths 450-454 may actually take any desired configuration and may use any type and number of delay elements.

Figure 5A:
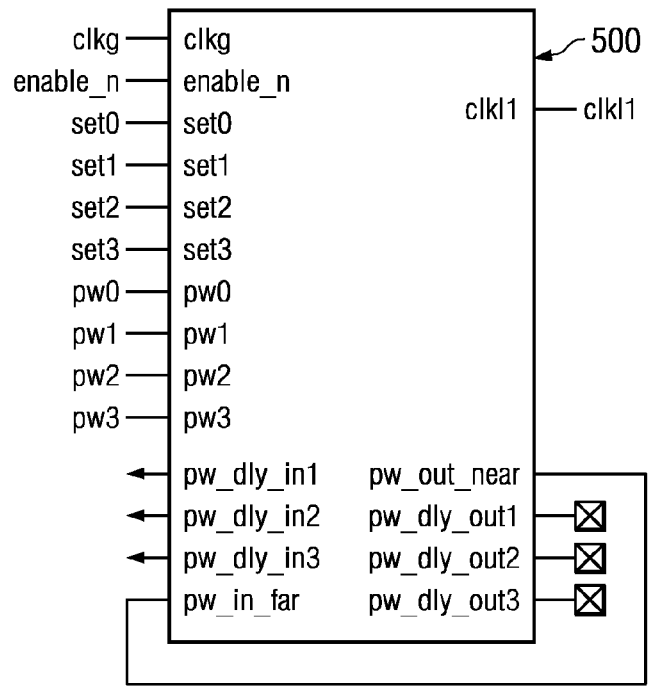
FIGS. 5A-5C are exemplary diagrams illustrating various implementations of the LCB of the illustrative embodiments.
Figure 5B:
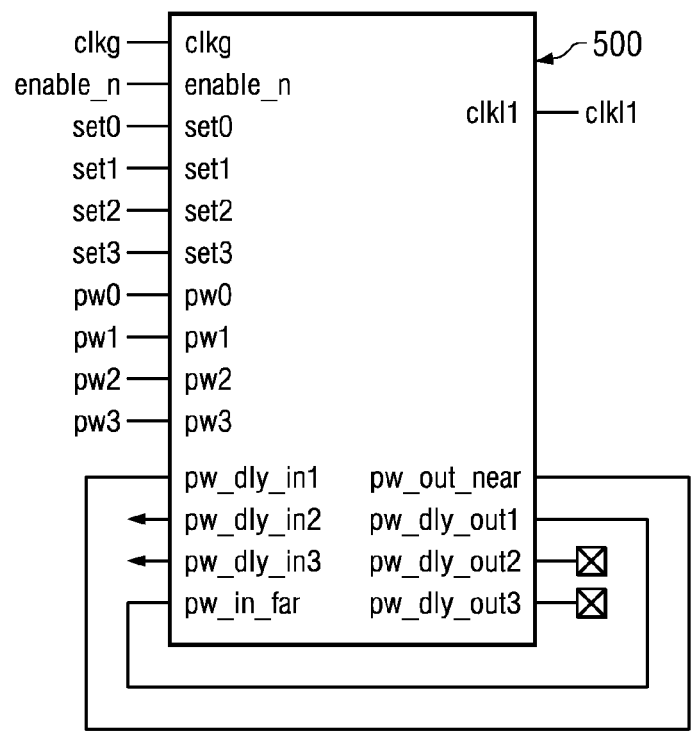
Figure 5C:
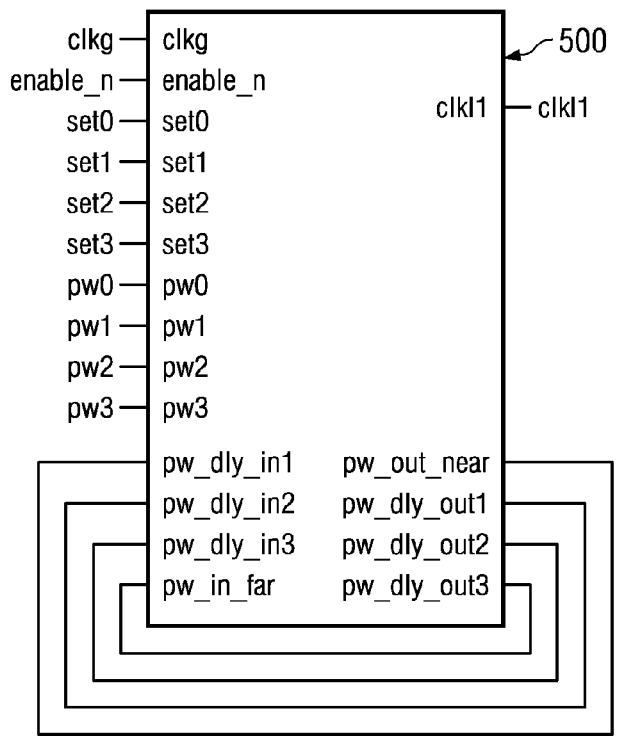

FIGS. 5A-5C are exemplary diagrams illustrating various implementations of the LCB of the illustrative embodiments. In FIG. 5A, a logic block 500 is shown that corresponds to the LCB 400 of FIGS. 4A-4E. In FIG. 5A, the pw_out_near output of the logic block 500 is connected to the pw_in_far input of the logic block 500. As a result, all of the inserted delay circuit paths, e.g., delay buffer chains, are bypassed and there is no additional modification to the initial settings of the offset and pulse width of the clock signal output by the logic block 500.

In FIG. 5B, the logic block 500 has the pw_out_near output connected to the pw_dly_in1 input and the pw_in_far input connected to the pw_dly_out1 output of the delay circuit paths. Referring again to FIGS. 4A-4E, this corresponds to connection line 460 being connected to the pw_dly_in1 input of inserted delay circuit path 450 and connection line 462 being connected to pw_dly_out1 of inserted delay circuit path 450. As a result, the pulse width of the output clock clkl1 is increased by an amount determined from the additional delay value generated by the delay elements of the delay circuit path 450.

In FIG. 5C, the logic block 500 has the pw_out_near output connected to pw_dly_in1 input and the pw_in_far input connected to the pw_dly_out3 output of the logic block 500. In addition, the pw_dly_out1 output is connected to the pw_dly_in2 input and the pw_dly_out2 output is connected to the pw_dly_in3 input of the logic block 500. As a result, all three delay circuit paths 450-454 in FIGS. 4A-4E are utilized in adjusting the pulse width of the output clock signal clkl1.

Thus, with the mechanisms of the illustrative embodiments, a designer may set the LCBs of an integrated circuit design to a same initial setting using the pre-established settings available in the basic LCB logic element. Thus, a common LCB is used throughout the integrated circuit design. Where additional adjustment of the pulse width or offset of the clock signal is needed or desired, the designer, or an automated mechanism, may add in additional delay circuit paths to the LCB's pre-established setting circuit paths to fine tune the initial settings of the LCBs at selected locations in the integrated circuit design. Thus, the ease of having a common LCB element utilized throughout the integrated circuit design is partnered with the ability to perform fine tune adjustments of the initial settings of the LCB elements where necessary or desired in the integrated circuit design.

Figure 6:
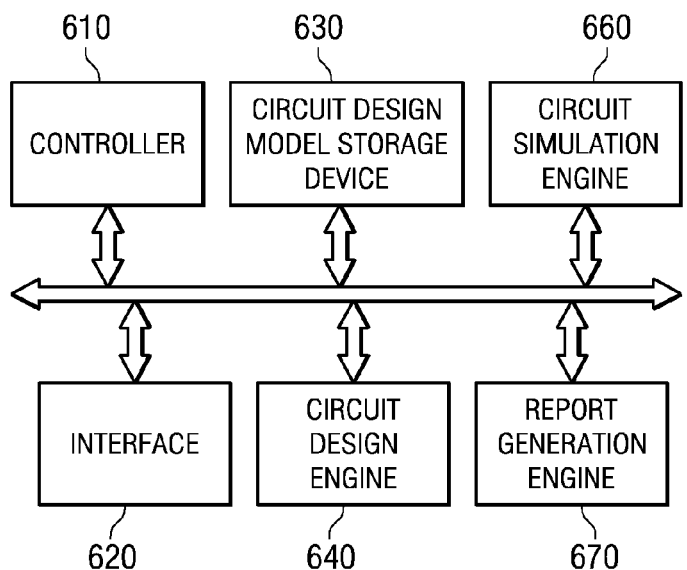
FIG. 6 is an exemplary block diagram of the primary operational elements of an integrated circuit design and simulation system in accordance with one illustrative embodiment.

FIG. 6 is an exemplary block diagram of the primary operational elements of an integrated circuit design and simulation system in accordance with one illustrative embodiment. As shown in FIG. 6, the circuit design and simulation system 600 includes a controller 610, an interface 620, a circuit design model storage device 630, a circuit design engine 640, a circuit simulation engine 660, and a report generation engine 670. The elements 610-670 may be implemented in hardware, software, or any combination of hardware and software. In one illustrative embodiment, the elements 610-670 are implemented as software instructions executed by one or more data processing devices.

The controller 610 controls the overall operation of the circuit design and simulation system 600 and orchestrates the operation of the other elements 620-670. The interface 620 provides a communication interface through which user input and/or integrated circuit design model information may be received from other applications and/or other computing devices. The interface 620 may be a network interface through which user input and/or integrated circuit model information may be received from one or more client devices and results of simulation may be provided to the one or more client devices. The interface 620 may also be an interface through which user input is received to configure simulations performed by the circuit simulation system 600.

Via the user interface 620, a user of a client device may interface with the circuit design engine 640 to generate an integrated circuit design, which is then converted to a model that is used in simulation of the integrated circuit design. The user may provide input for specifying the logic blocks and connections between logic blocks of an integrated circuit design. As part of the user input, a user may insert into the integrated circuit design, the LCB logic blocks of the illustrative embodiments and may provide input for specifying the manner by which the inserted delay circuit paths are to be connected to the pre-established offset and pulse width setting paths of the LCB logic block. For example, the user may specify connections of outputs and inputs of the LCB logic block to achieve one of the configurations illustrated in FIGS. 5A-5C, or another similar type of configuration.

The circuit design model storage device 630 stores the integrated circuit model information corresponding to the integrated circuit design for use in performing simulation. This circuit model information may include, for example, one or more netlist data structures specifying the nets of the integrated circuit model, phase and/or periodicity information of clock signals of the integrated circuit model, as well as other information that typically makes up an integrated circuit model as is generally known in the art.

The integrated circuit design engine 640 operates to provide a user interface through which a user may design an integrated circuit device. Integrated circuit design engines are generally known in the art and thus, a detailed explanation of them is not provided herein. However, the integrated circuit design engine 640 of the illustrative embodiments is augmented to include the ability to use a common LCB logic block and corresponding circuit according to the illustrative embodiments. Thus, via the integrated circuit design engine 640, the user may select the LCB logic block and circuit of the illustrative embodiments to be used in the integrated circuit design, specify the initial settings of the LCB logic block and circuit, and further specify the modifications to the initial settings for various instantiations of the LCB logic block in the integrated circuit design.

The circuit simulation engine 660 performs simulation of the integrated circuit model corresponding to the integrated circuit design that includes the new LCB logic block and circuit of the illustrative embodiments. The circuit simulation engine 660 analyzes the results of the circuit simulation in a manner generally known in the art. This analysis may identify problems in the behavior of the integrated circuit model based on specified desired operational behavior, for example, so that notifications may be generated for informing a human designer of areas where the integrated circuit model/design may need to be modified. The report generation engine 670 may generate such reports for output to the user, such as via the interface 620 to a client device, for example. The analysis of simulation results and generation of reports is generally known in the art.

Figure 7:
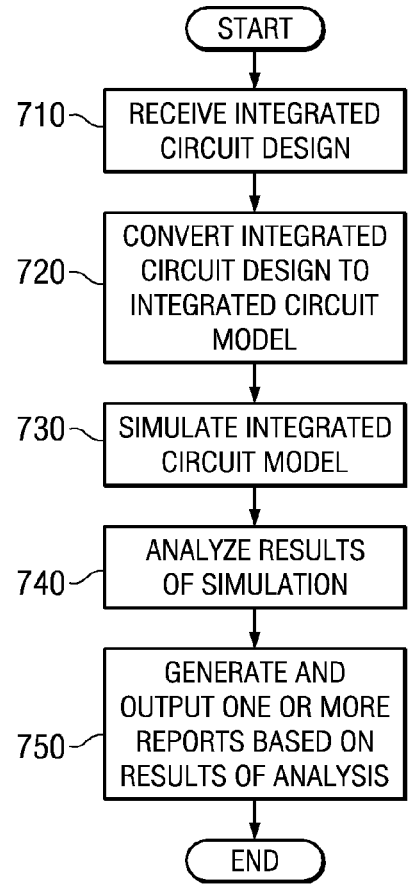
FIG. 7 is a flowchart outlining an exemplary operation for designing an integrated circuit device in accordance with one illustrative embodiment.

FIG. 7 is a flowchart outlining an exemplary operation for designing an integrated circuit device in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts by the integrated circuit design and simulation system receiving an integrated circuit design (step 710). The integrated circuit design may be received via user interaction with the integrated circuit design and simulation system to thereby generate an integrated circuit design or it may be provided by the user's client device as a pre-generated integrated circuit design, for example. With particular emphasis to the illustrative embodiments, the integrated circuit design preferably includes at least one LCB logic block corresponding to the LCB logic block provided by the illustrative embodiments.

The integrated circuit design is converted to an integrated circuit model that may be used with an integrated circuit simulation system (step 720), e.g., netlists and other integrated circuit model information are generated from the integrated circuit design. The integrated circuit design and simulation system then simulates the integrated circuit model (step 730). The integrated circuit design and simulation system analyzes the results of the simulation of the integrated circuit model (step 740) and generates one or more reports for informing a user of results of the simulation (step 750). The operation then terminates.

Thus, with the mechanisms of the illustrative embodiments, a new LCB structure is provided in which additional delay circuit paths are provided which may be selectively connected to pre-established offset and/or pulse width setting circuit paths of the LCB structure to thereby fine tune the initial offset and/or pulse width of the LCB. The new LCB structure may be utilized in an integrated circuit device design system to provide differing initial offsets and/or pulse widths of a clock signal provided by a clock grid in order to provide local clock signals for different local circuit portions of the integrated circuit device. The selection of the delay circuit path or paths to connect to the pre-established offset and/or pulse width setting circuit paths may be made when the LCB is instantiated in the integrated circuit device design. Thereafter, the integrated circuit device design may be utilized to fabricate the integrated circuit device.

The circuit as described above may be part of the design for an integrated circuit device, such as an integrated circuit chip. Moreover, the methodology described above may be used in the fabrication of such an integrated circuit device or chip. As mentioned above, the integrated circuit device design may be created in a graphical computer programming language, and stored in a computer storage medium (such as a disk, tape, physical hard drive, or virtual hard drive such as in a storage access network). If the designer does not fabricate the integrated circuit device/chip or the photolithographic masks used to fabricate such devices/chips, the designer may transmit the resulting design by physical means (e.g., by providing a copy of the storage medium storing the design) or electronically (e.g., through the Internet) to such entities, directly or indirectly. The stored design may then converted into the appropriate format (e.g., GDSII) for the fabrication of photolithographic masks, which typically include multiple copies of the integrated circuit device/chip design in question that are to be formed on a wafer. The photolithographic masks may be utilized to define areas of the wafer (and/or the layers thereon) to be etched or otherwise processed.

The resulting integrated circuit devices/chips may be distributed by the fabricator in raw wafer form (that is, as a single wafer that has multiple unpackaged chips), as a bare die, or in a packaged form. In the latter case the device/chip may be mounted in a single device/chip package (such as a plastic carrier, with leads that are affixed to a motherboard or other higher level carrier) or in a multi-device/chip package (such as a ceramic carrier that has either or both surface interconnections or buried interconnections). In any case the device/chip may then integrated with other devices/chips, discrete circuit elements, and/or other signal processing devices as part of either (a) an intermediate product, such as a motherboard, or (b) an end product. The end product may be any product that includes integrated circuit devices/chips, ranging from toys and other low-end applications to advanced computer products having a display, a keyboard or other input device, and a central processor. Moreover, the end products in which the integrated circuit devices/chips may be provided may include game machines, game consoles, hand-held computing devices, personal digital assistants, communication devices, such as wireless telephones and the like, laptop computing devices, desktop computing devices, server computing devices, or any other computing device.

It should be appreciated that the illustrative embodiments in which the circuits described previously are utilized in an circuit design system may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the circuit design system illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing an integrated circuit, comprising:

receiving an integrated circuit design;

providing a local clock buffer in association with a local portion of the integrated circuit design;

providing one or more delay circuit paths, the one or more delay circuit paths being selectively connectable to existing circuit paths in the local clock buffer;

configuring the local clock buffer to use one of the existing circuit paths in the local clock buffer to obtain a pre-established initial clock signal characteristic for converting an input clock signal to a local clock signal output; and selectively connecting the existing circuit path used by the local clock buffer to at least one of the one or more delay circuit paths to thereby modify the pre-established initial clock signal characteristic to thereby provide a modified initial clock signal characteristic for the local clock signal output.

2. The method of claim 1, wherein the local clock buffer receives a clock input signal from a clock signal grid of the integrated circuit design and provides the local clock signal output to the local portion of the integrated circuit design.

3. The method of claim 1, wherein the pre-established initial clock signal characteristic is a pulse width of the initial clock signal, and wherein the modified initial clock signal characteristic is a modified pulse width of the initial clock signal.

4. The method of claim 1, wherein the initial clock signal characteristic is an offset of the initial clock signal, and wherein the modified initial clock signal characteristic is a modified offset of the initial clock signal.

5. The method of claim 1, wherein a plurality of local clock buffers are provided, each local clock buffer in the plurality of local clock buffers utilizes a same circuit element to represent the local clock buffers, and wherein at least two of the plurality of local clock buffers have differing connections to the one or more delay circuit paths to thereby provide at least two local clock buffers that provide differing local clock signal outputs.

6. The method of claim 5, wherein the one or more delay circuit paths are provided as part of the circuit element.

7. The method of claim 5, wherein the one or more delay circuit paths are provided as a user-specific separate logic block that is selectively added to the circuit elements representing the local clock buffers which do not include the one or more delay paths.

8. A computer program product comprising a computer readable storage medium having a computer readable program, wherein the computer readable program, when executed on a computing device, causes the computing device to:

receive an integrated circuit design;

provide a local clock buffer in association with a local portion of the integrated circuit design;

provide one or more delay circuit paths, the one or more delay circuit paths being selectively connectable to existing circuit paths in the local clock buffer;

configure the local clock buffer to use one of the existing circuit paths in the local clock buffer to obtain a pre-established initial clock signal characteristic for converting an input clock signal to a local clock signal output; and selectively connect the existing circuit path used by the local clock buffer to at least one of the one or more delay circuit paths to thereby modify the pre-established initial clock signal characteristic to thereby provide a modified initial clock signal characteristic for the local clock signal output.

9. The computer program product of claim 8, wherein the local clock buffer receives a clock input signal from a clock signal grid of the integrated circuit design and provides the local clock signal output to the local portion of the integrated circuit design.

10. The computer program product of claim 8, wherein the pre-established initial clock signal characteristic is a pulse width of the initial clock signal, and wherein the modified initial clock signal characteristic is a modified pulse width of the initial clock signal.

11. The computer program product of claim 8, wherein the initial clock signal characteristic is an offset of the initial clock signal, and wherein the modified initial clock signal characteristic is a modified offset of the initial clock signal.

12. The computer program product of claim 8, wherein a plurality of local clock buffers are provided, each local clock buffer in the plurality of local clock buffers utilizes a same circuit element to represent the local clock buffers, and wherein at least two of the plurality of local clock buffers have differing connections to the one or more delay circuit paths to thereby provide at least two local clock buffers that provide differing local clock signal outputs.

13. The computer program product of claim 12, wherein the one or more delay circuit paths are provided as part of the circuit element.

14. The computer program product of claim 12, wherein the one or more delay circuit paths are provided as a user-specific separate logic block that is selectively added to the circuit elements representing the local clock buffers which do not include the one or more delay paths.

15. A data processing system, comprising:

a processor; and a memory coupled to the processor, wherein the memory comprises instructions which, when executed by the processor, cause the processor to:

receive an integrated circuit design;

provide a local clock buffer in association with a local portion of the integrated circuit design;

provide one or more delay circuit paths, the one or more delay circuit paths being selectively connectable to existing circuit paths in the local clock buffer;

configure the local clock buffer to use one of the existing circuit paths in the local clock buffer to obtain a pre-established initial clock signal characteristic for converting an input clock signal to a local clock signal output; and selectively connect the existing circuit path used by the local clock buffer to at least one of the one or more delay circuit paths to thereby modify the pre-established initial clock signal characteristic to thereby provide a modified initial clock signal characteristic for the local clock signal output.

16. The system of claim 15, wherein the local clock buffer receives a clock input signal from a clock signal grid of the integrated circuit design and provides the local clock signal output to the local portion of the integrated circuit design.

17. The system of claim 15, wherein the pre-established initial clock signal characteristic is a pulse width of the initial clock signal, and wherein the modified initial clock signal characteristic is a modified pulse width of the initial clock signal.

18. The system of claim 15, wherein the initial clock signal characteristic is an offset of the initial clock signal, and wherein the modified initial clock signal characteristic is a modified offset of the initial clock signal.

19. The system of claim 15, wherein a plurality of local clock buffers are provided, each local clock buffer in the plurality of local clock buffers utilizes a same circuit element to represent the local clock buffers, and wherein at least two of the plurality of local clock buffers have differing connections to the one or more delay circuit paths to thereby provide at least two local clock buffers that provide differing local clock signal outputs.

20. The system of claim 19, wherein the one or more delay circuit paths are provided as part of the circuit element.

21. The system of claim 19, wherein the one or more delay circuit paths are provided as a user-specific separate logic block that is selectively added to the circuit elements representing the local clock buffers which do not include the one or more delay paths.

* * * * *